Patented Nov. 14, 1933

1,934,709

UNITED STATES PATENT OFFICE 1,934,709

COATED FABRIC

Andrew Joseph Hemmer, Malden, Mass., assignor to E. I. du Pont de Nemours & Company, Wilmington, Del., a corporation of Delaware No Drawing. Application August 28, 1930
Serial No. 478,549

13 Claims. (Cl. 91—70)

This invention relates to the art of artificial leather, and more particularly to coated fabrics provided with a polyhydric alcohol-polybasic acid resin asphalt varnish.

For many years it has been customary to finish rubber coated fabrics for use as automobile top materials with a final coat of oil varnish, but all of such materials with which I am familiar have rapidly deteriorated and quickly lost their gloss on exposure to the direct rays of the summer sun, thus rendering them prematurely unsightly and unsatisfactory.

The first successful solution of these problems was that developed by John R. Couture and disclosed and claimed in Patent No. 1,795,199, granted March 3, 1931, which involved the application of a coat of asphalt varnish either directly over the rubber coated fabric or with the interposition of an intermediate coat of oil varnish. I have discovered that such materials may be further improved by the use of a polyhydric alcohol-polybasic acid resin asphalt varnish for the top coat.

By the term "gum", as used herein, I mean a natural resinous product, such as kauri or Congo, an asphalt, or an artificial resinous product, such as ester gum.

By the term "polyhydric alcohol-polybasic acid resin", as used herein, I mean the resinous condensation product resulting from the interaction of one or more polyhydric alcohols, one or more polybasic acids, and one or more drying oils and/or drying oil acids, with or without one or more additional modifying ingredients, such as natural resins and other synthetic resins.

By the term "asphalt", as used herein, I mean an asphaltic substance, such as petroleum asphalt, refined natural asphalt, gilsonite, mineral pitch, stearin pitch or bitumen.

By the term "petroleum asphalt", as used herein, I mean a petroleum residue asphalt having a softening point between 150° and 250° F., as determined by the ball and ring method described in A. S. T. M. Standards, 1921, page 944, under the serial designation D—36—21.

By the term "polyhydric alcohol-polybasic acid resin asphalt varnish", as used herein, I mean a varnish in which the gum comprises asphalt, in which the usual oil component of a varnish is at least partially replaced by a polyhydric alcohol-polybasic acid resin, and which contains suitable volatile solvent, with or without other ingredients, such as drying oils, driers and/or pigments.

By the term "drying oil", as used herein, I mean an oil of the drying type, such as linseed oil, Chinawood oil or perilla oil.

By the term "bodied oil", as used herein, I mean a drying oil whose characteristics have been altered by heating or blowing, or both, and including an increase in the viscosity of the oil regardless of whether the bodying has been completed or only partially completed.

By the term "oil varnish", as used herein, I mean a varnish containing drying oil, gum and solvent, with or without driers and/or pigments, but in no case including varnishes in which asphalt exceeds one-half the weight of the drying oil and, in my preferred compositions, asphalt does not exceed one-fourth of the drying oil.

By the term "drier", as used herein, I mean an ingredient which is capable of promoting the oxidation of the drying oil with which it is used, such as cobalt linoleate, cobalt resinate, or lead and manganese linoleates.

By the term "5 gallon resin content", as used herein, I mean that the varnish referred to contains 5 gallons of resin (assuming an approximate weight of 8 lbs. per gallon) per 100 lbs. of asphalt. Where other figures are used to modify the expression "gallon resin content", these figures are arrived at in a similar way, namely, by dividing the weight of the resin per 100 lbs. of asphalt by 8.

By the terms "per cent of oil" or "per cent oil", as used herein, I mean that the finished resin to which these terms are applied contains the per cent of oil modifying ingredients indicated, regardless of the form in which the oil modifying ingredients are present.

By the term "pigment", as used herein, I mean an ingredient, other than asphalt, which is capable of imparting a substantially permanent color to the ingredients with which it is combined.

By the term "coating composition", as used herein, I mean a film-forming material or combination of materials capable of forming a protective, decorative and/or an adhesive layer for the material to which applied.

By the term "coated fabric", as used herein, I mean a fabric base material of any desired type provided with a coating of rubber or other material thereover to protect it and transform it into an artificial leather, regardless of how the coating material is calendered or spread upon the base material.

By the terms "gloss" and "lustre" of artificial leather, as used herein, I mean the property of reflecting light which is incident thereon.

By the term "durability", as used herein, I mean the property of remaining smooth and continuous without the development of cracks or checks which permit the passage of sunlight and moisture through the outer surface.

It is an object of the present invention to provide new and useful coated fabrics.

It is another object of this invention to provide new and improved rubber coated fabrics.

It is a further object of this invention to provide rubber coated fabrics having a top coat of polyhydric alcohol-polybasic acid resin asphalt varnish.

With the above and other objects in view, which will be apparent as the description proceeds, I have set forth my invention in the following specification and have included the following examples by way of illustration and not as a limitation.

*Example 1*

|  | Parts by weight |
|---|---|
| Petroleum asphalt | 100. |
| Resin A (acid No. 28.2) | 20. |
| Solvent naphtha | 120. |
| Cobalt drier | 0.65 |
| Total | 240.65 |

The asphalt is heated to 500° F., allowed to cool to 425° F., an equal weight of solvent naphtha is added, and the mixture is stirred until the asphalt is completely dissolved. To this solution is added 40 parts by weight of a 50% solution of resin A in solvent naphtha and 0.65 parts by weight of a cobalt drier solution containing 1.45% cobalt.

Resin A, used in the above composition, was formed from the following ingredients, using the proportions indicated:

|  | Parts by weight |
|---|---|
| Glycerol | 14.11 |
| Phthalic anhydride | 16.88 |
| Linseed oil acids | 69.01 |
| Total | 100.00 |

*Example 2*

|  | Parts by weight |
|---|---|
| Petroleum asphalt | 100. |
| Resin A (acid No. 28.2) | 40. |
| Solvent naphtha | 100. |
| Turpentine | 40. |
| Lead-manganese drier | 4.1 |
| Total | 284.1 |

The asphalt is heated to 500° F., allowed to cool to 425° F., an equal weight of solvent naphtha is added, and the mixture is stirred until the asphalt is completely dissolved. To this solution is added 80 parts by weight of a 50% solution of resin A in turpentine and 4.1 parts by weight of a drier solution containing 1.47% lead and 0.41% manganese.

*Example 3*

|  | Parts by weight |
|---|---|
| Petroleum asphalt | 100. |
| Resin B (acid No. 17.6) | 40. |
| Solvent naphtha | 100. |
| Turpentine | 40. |
| Lead-manganese drier | 4.1 |
| Total | 284.1 |

The asphalt is heated to 500° F., allowed to cool to 425° F., an equal weight of solvent naphtha is added, and the mixture is stirred until the asphalt is completely dissolved. To this solution is added 80 parts by weight of a 50% solution of resin B in turpentine and 4.1 parts by weight of a drier solution containing 1.47% lead and 0.41% manganese.

Resin B, used in the above composition, was formed from the following ingredients, using the proportions indicated:

|  | Parts by weight |
|---|---|
| Glycerol | 17.11 |
| Phthalic anhydride | 27.09 |
| Linseed oil acids | 55.80 |
| Total | 100.00 |

*Example 4*

|  | Parts by weight |
|---|---|
| Petroleum asphalt | 100. |
| Resin C (acid No. 21.4) | 120. |
| Solvent naphtha | 100. |
| Turpentine | 120. |
| Lead-manganese drier | 12.30 |
| Total | 452.30 |

The asphalt is heated to 500° F., allowed to cool to 425° F., an equal weight of solvent naphtha is added, and the mixture is stirred until the asphalt is completely dissolved. To this solution is added 240 parts by weight of a 50% solution of resin C in turpentine and 12.30 parts by weight of a drier solution containing 1.47% lead and 0.41% manganese.

Resin C, used in the above composition, was formed from the following ingredients, using the proportions indicated:

|  | Parts by weight |
|---|---|
| Glycerol | 14.95 |
| Phthalic anhydride | 28.35 |
| Linseed oil acids | 28.35 |
| Chinawood oil acids | 28.35 |
| Total | 100.00 |

*Example 5*

|  | Parts by weight |
|---|---|
| Gilsonite | 100. |
| Resin B (acid No. 17.6) | 60. |
| Solvent naphtha | 100. |
| Turpentine | 60. |
| Lead-manganese drier | 6.15 |
| Total | 326.15 |

The gilsonite is heated to 500° F., allowed to cool to 425° F., an equal weight of solvent naphtha is added, and the mixture is stirred until the gilsonite is completely dissolved. To this solution is added 120 parts by weight of a 50% solution of resin B in turpentine and 6.15 parts by weight of a drier solution containing 1.47% lead and 0.41% manganese.

The polyhydric alcohol-polybasic acid resins referred to above may be made in any well known manner, as, for example, by heating the ingredients at any suitable temperature above the melting point of the materials until resinification is complete. The mixture may be agitated in any desired way, as by mechanical agitation or by the aid of a stream of an inert gas. Likewise, when desired, refluxing or partial refluxing may be resorted to, or the operation may be carried out at elevated or reduced pressures.

Where oil is used in place of oil acids, it is desirable, in order to obtain a homogeneous product, to heat the oil and glycerol together before adding the phthalic anhydride. Other modifying ingredients, if used, may be added in either stage.

Although glycerol has been used as the polyhydric alcohol and phthalic anhydride has been used as the polybasic acid in the above examples of polyhydric alcohol-polybasic acid resins falling within the scope of the present invention, other polyhydric alcohols, such as glycol, and other polybasic acids, such as succinic acid, may be used. Likewise, although linseed oil acids and Chinawood oil acids have been used in the above examples, the oils themselves, or mixtures of the oils and oil acids, as well as other drying oils, such as perilla oil, or other drying oil acids, such as perilla oil acids, may be used.

As indicated by the above examples, the varnishes made in accordance with this invention may include various types of polyhydric alcohol-polybasic acid resins modified with drying oils or drying oil acids, and these resins may be of varying acid number. In general, however, the resins of lower acid number and the resins of shorter oil length form less satisfactory varnishes of the type disclosed herein, since they are not as compatible with asphalts as resins of higher acid number and resins of longer oil length.

For instance, the resin of Example 3, which contains 60% of oil and has an acid number of 17.6, forms satisfactory varnishes of 7½ gallon resin content, but if the acid number is reduced to 6, it is difficult, if not impossible, to produce satisfactory asphalt varnishes of more than 5 gallon resin content. Furthermore, even if the acid number of this particular resin is not carried as low as 17.6, it is difficult to produce satisfactory asphalt varnishes of appreciably more than 7½ gallon resin content, owing to the comparatively low oil content of the resin. With resins containing less than 60% oil, for example those containing 50% oil, it is difficult to produce satisfactory asphalt varnishes of more than 5 gallon resin content, even though the acid number is kept relatively high. This difficulty increases as the oil length is decreased. On the other hand, where the oil length of the resin used is greater than 60%, as in resin A, where it is 75%, satisfactory asphalt varnishes can be produced up to approximately 20 gallon resin content with resins whose acid number is 28.2. When resins of the latter type, but of lower acid number, are employed, the resin content of the asphalt varnishes should be reduced proportionately. For instance, with resin A, if the acid number is 16.1, the resin content should not exceed 15 gallons, and if the acid number is 6.4, the resin content should not exceed 7½ to 10 gallons.

Although the above examples have been limited to the use of petroleum asphalt and gilsonite, I desire to have it understood that other asphalts, as indicated in the definition of "asphalt" given above, may be used, but I have obtained the best results with petroleum asphalt.

In the above examples, solvent naphtha and turpentine have been stressed as the solvents used, but other solvents, such as toluol, xylol and Hi-flash naphtha, may also be employed.

The varnishes set forth above, as well as other varnishes falling within the scope of the present invention, are highly useful in finishing rubber coated fabrics, and particularly those to be used as automobile top materials. In the manufacture of such materials the varnish may be applied either as a single coat directly over the rubber coated fabric, or it may be applied as the final coat in a two coat system in which the intermediate coat is a long oil varnish.

Examples of suitable oil varnishes are as follows:

Example 6

| | Parts by weight |
|---|---|
| Carbon black | 2.5 |
| Bodied linseed oil and drier | 45.0 |
| Turpentine substitute | 52.5 |
| Total | 100.0 |

Example 7

| | Parts by weight |
|---|---|
| Carbon black | 2.5 |
| Bodied Chinawood oil and drier | 20.0 |
| Bodied linseed oil and drier | 20.0 |
| Petroleum residue asphalt | 3.5 |
| Turpentine substitute | 54.0 |
| Total | 100.0 |

In two coat systems embodying my invention the initial coat of varnish is preferably applied over unvulcanized rubber and the system is then baked at a temperature and for a time sufficient to dry the varnish, but insufficient to completely vulcanize the rubber. After this drying operation the final coat of asphalt varnish is then applied and the complete system is baked at a temperature and for a period sufficient to complete the vulcanization of the rubber and to effect the drying of the asphalt varnish. In general, 1 hour's heating up to 255° F. is sufficient for the drying of the oil varnish, and 2¼ hours' heating at 255° F. is satisfactory for baking the final coat.

In the manufacture of rubber coated fabrics involving the one coat system, the asphalt varnish is likewise preferably applied over unvulcanized rubber and the complete system is then baked at a temperature and for a period suitable for the simultaneous vulcanization of the rubber and the drying of the asphalt varnish. A suitable drying schedule is 2½ hours' heating at 255° F.

The two coat system is preferred to the one coat system, especially over a rubber coated fabric, because it has greater durability and retains its gloss for a longer time. Without limiting myself thereto, I believe this is due to the elastic intermediate coat of oil varnish acting as a buffer or bridge between the extremely elastic rubber compound and the comparatively inelastic polyhydric alcohol-polybasic acid resin asphalt varnish film.

It will therefore be apparent that I have developed new and useful coated fabrics which possess improved lustre and durability as compared with materials heretofore available, and new and useful processes for producing same. While said processes and coated fabrics have been described in connection with rubber coated fabrics, since these represent the preferred embodiments of my invention, it is apparent that the finishes disclosed herein may also be used in finishing other materials, such as nitrocellulose coated and linseed oil coated fabrics.

As many apparently widely different embodiments of this invention may be made without departing from the spirit and scope thereof, it is to be understood that I do not limit myself to the specific embodiments thereof except as defined in the appended patent claims.

I claim:

1. A process of making an artificial leather which comprises applying a coating to a fabric, applying a coating of polyhydric alcohol-polybasic acid resin asphalt varnish thereon, and baking the resulting product, said polyhydric alcohol-polybasic acid resin containing, in combined form, the acid radical of an oil having drying properties.

2. As an article of manufacture, a coated flexible fabric sheeting having a final coat of baked polyhydric alcohol-polybasic acid resin asphalt varnish, said polyhydric alcohol-polybasic acid resin containing, in combined form, the acid radical of an oil having drying properties.

3. A process of making an artificial leather which comprises applying a coating to a fabric, applying a coating of polyhydric alcohol-polybasic acid resin petroleum asphalt varnish thereon, and baking the resulting product, said polyhydric alcohol-polybasic acid resin containing, in combined form, the acid radical of an oil having drying properties.

4. As an article of manufacture, a coated flexible fabric sheeting having a final coat of baked polyhydric alcohol-polybasic acid resin petroleum asphalt varnish, said polyhydric alcohol-polybasic acid resin containing, in combined form, the acid radical of an oil having drying properties.

5. A process of making an artificial leather which comprises applying over a textile fabric a layer of uncured rubber, applying a coating of polyhydric alcohol-polybasic acid resin asphalt varnish thereover, and baking the resulting product, said polyhydric alcohol-polybasic acid resin containing, in combined form, the acid radical of an oil having drying properties.

6. As an article of manufacture, a rubber coated flexible fabric sheeting having a final coat of baked polyhydric alcohol-polybasic acid resin asphalt varnish, said polyhydric alcohol-polybasic acid resin containing, in combined form, the acid radical of an oil having drying properties, said last mentioned component constituting from 50 to 75% of the weight of the finished resin.

7. A process of making an artificial leather which comprises applying over a textile fabric a layer of uncured rubber, applying a coating of polyhydric alcohol-polybasic acid resin petroleum asphalt varnish thereover, and baking the resulting product, said polyhydric alcohol-polybasic acid resin containing, in combined form, the acid radical of an oil having drying properties, said last mentioned component constituting from 50 to 75% of the weight of the finished resin.

8. As an article of manufacture, a rubber coated flexible fabric sheeting having a final coat of baked polyhydric alcohol-polybasic acid resin petroleum asphalt varnish, said polyhydric alcohol-polybasic acid resin containing, in combined form, the acid-radical of an oil having drying properties, said last mentioned component constituting from 50 to 75% of the weight of the finished resin.

9. As an article of manufacture a rubber coated textile fabric having a final coat of polyhydric alcohol-polybasic acid resin petroleum asphalt varnish, said polyhydric alcohol-polybacis acid resin containing, in combined form, the acid radical of an oil having drying properties, said last mentioned component constituting from 50 to 75% of the weight of the finished resin.

10. A process of finishing a rubber coated fabric which comprises applying over the rubber a coat of oil varnish, drying the oil varnish coat, and then applying a final coat of polyhydric alcohol-polybasic acid resin asphalt varnish, said polyhydric alcohol-polybasic acid resin containing, in combined form, the acid radical of an oil having drying properties.

11. An an article of manufacture, a rubber coated fabric having an intermediate coat of oil varnish and a final coat of baked polyhydric alcohol-polybasic acid resin asphalt varnish, said polyhydric alcohol-polybasic acid resin containing, in combined form, the acid radical of an oil having drying properties.

12. A process of finishing a rubber coated textile fabric which comprises applying over the rubber a final coat of polyhydric alcohol-polybasic acid resin asphalt varnish containing between 2½ and 20 gallons of polyhydric alcohol-polybasic acid resin per 100 pounds of asphalt, and baking it at the vulcanizing temperature of the rubber compound, said polyhydric alcohol-polybasic acid resin containing, in combined form, the acid radical of an oil having drying properties, said last mentioned component constituting from 50 to 75% of the weight of the finished resin.

13. As an article of manufacture, a rubber coated textile fabric having a final coat of baked polyhydric alcohol-polybasic acid resin asphalt varnish containing between 2½ and 20 gallons of polyhydric alcohol-polybasic acid resin per 100 pounds of asphalt, said polyhydric alcohol-polybasic acid resin containing, in combined form, the acid radical of an oil having drying properties, said last mentioned component constituting from 50 to 75% of the weight of the finished resin.

ANDREW J. HEMMER.